United States Patent
Hong et al.

(10) Patent No.: US 9,810,367 B2
(45) Date of Patent: Nov. 7, 2017

(54) EQUIPMENT LEVELER

(71) Applicant: ECOMICRON, INC., San Jose, CA (US)

(72) Inventors: Jae Hwan Hong, San Jose, CA (US); Jung Hoon Sun, San Jose, CA (US); Chang Won Kim, San Jose, CA (US)

(73) Assignee: EcoMicron, Inc., San Jose, CA (US)

( * ) Notice: Subject to any disclaimer, the term of this patent is extended or adjusted under 35 U.S.C. 154(b) by 0 days.

(21) Appl. No.: 15/374,880

(22) Filed: Dec. 9, 2016

(65) Prior Publication Data

US 2017/0122489 A1    May 4, 2017

Related U.S. Application Data

(63) Continuation-in-part of application No. PCT/US2015/064812, filed on Dec. 9, 2015.

(60) Provisional application No. 62/090,312, filed on Dec. 10, 2014.

(51) Int. Cl.
*F16M 11/20* (2006.01)
*F16M 7/00* (2006.01)

(52) U.S. Cl.
CPC ............ *F16M 7/00* (2013.01); *F16M 2200/08* (2013.01)

(58) Field of Classification Search
CPC .................. F16M 7/00; F16M 2200/08
See application file for complete search history.

(56) References Cited

U.S. PATENT DOCUMENTS

| 3,921,958 A | 11/1975 | Brockelsby et al. |
| 4,858,865 A | 8/1989 | Schrepfer |
| 6,702,246 B1* | 3/2004 | Schriever ................. F16M 7/00 248/656 |
| 6,729,590 B2 | 5/2004 | Gabriel |
| 9,572,429 B2* | 2/2017 | Basesme .............. A47L 15/4253 |
| 2003/0052241 A1* | 3/2003 | Bizaj ........................ F16M 7/00 248/188.2 |
| 2010/0276564 A1 | 11/2010 | Fetzer et al. |

FOREIGN PATENT DOCUMENTS

KR    10-1359871 B1    7/2014

OTHER PUBLICATIONS

International Search Report and Written Opinion, PCT/US2015/064812, dated Feb. 9, 2016, 9 pgs.

* cited by examiner

*Primary Examiner* — Amy Sterling
(74) *Attorney, Agent, or Firm* — Morgan, Lewis & Bockius LLP

(57) ABSTRACT

A leveling device and an apparatus that utilizes the leveling device are described. The leveling device includes a main body, a rod rotatably coupled with the main body, an elevator block rotatably coupled with the rod and slidably coupled with a base block of the main body, and an elevator pin slidably coupled with the base block of the main body and slidably coupled with a sloped surface of the elevator block. A rotation of the rod causes a linear movement of the elevator block, which, in turn, causes a movement of the elevator pin in a direction that is perpendicular to the movement of the elevator block.

18 Claims, 19 Drawing Sheets

EQUIPMENT LEVELER

RELATED APPLICATIONS

This application is a continuation-in-part application of International Patent Application No. PCT/US2015/064812, filed Dec. 9, 2015, which claims priority to U.S. Provisional Patent Application No. 62/090,312, filed Dec. 10, 2014. Both of these applications are incorporated by reference herein in their entireties.

TECHNICAL FIELD

This application relates generally to devices and methods for leveling heavy equipments, including but not limited to devices and methods for leveling semiconductor processing equipments and/or their components.

SUMMARY

There is a need for devices that allow more accurate and faster leveling of apparatuses and/or their components. A number of embodiments that address the limitations and disadvantages described above are presented in more detail below. Such devices, apparatuses, and methods may replace the conventional devices, apparatuses, and methods. Alternatively, such devices, apparatuses, and methods may complement the conventional devices, apparatuses, and methods.

As described in more detail below, some embodiments involve a leveling device that includes a main body that has a base block, a connecting arm, and a top plate. The base block and the top plate are connected to the connecting arm so that the connecting arm is located between the base block and the top plate. The connecting arm has a particular width and a particular position such that the connecting arm, the base block, and the top plate collectively define a recess in the main body. The base block defines two holes. A first hole of the two holes is defined on a side of the base block that faces the top plate. A second hole of the two holes is connected to the first hole, and the second hole is substantially perpendicular to the first hole. The second hole has a first portion and a second portion, the first portion of the second hole having a circular cross section and the second portion of the second hole having a cross section that is not circular. The device also includes a rod rotatably coupled with the main body. The rod is at least partially positioned in the first portion of the second hole of the base block and the second portion of the second hole of the base block. A first portion of the rod, positioned toward the second hole, has a first thread. A second portion of the rod is not threaded. The rod is coupled with a knob that is positioned at least partially outside the main body. The device further includes an elevator block rotatably coupled with the rod and slidably coupled with the base block. The elevator block is at least partially positioned in the second portion of the second hole of the base block. The elevator block has a bottom surface that is substantially perpendicular to the rod. The elevator block has a top surface that is opposite to the bottom surface and that is not parallel to the bottom surface. The elevator block defines a through-hole that has the first thread. At least a part of the first portion of the rod, having the first thread, is positioned in the through-hole of the elevator block. An elevator pin slidably coupled with the base block and slidably coupled with the elevator block. The elevator pin is at least partially positioned in the first hole of the base block so that the elevator pin is configured to slide along the first hole of the base block. The elevator pin has a first end and a second end that is opposite to the first end and that is not parallel to the first end.

In accordance with some embodiments, an apparatus includes an apparatus body having three mounting points under the apparatus body. The three mounting points define a shape of a triangle on a particular plane. The apparatus also includes a tiltable component at least partially located within the apparatus body and at least partially extends outside the apparatus body under the apparatus body. The apparatus further includes three supports positioned at the three mounting points of the apparatus body and coupled with the tiltable component. The three supports include at least two leveling devices described above.

In some embodiments, one of the three supports is an immovable pin.

In some embodiments, the leveling device defines a through-hole, which is used to mount the leveling device to the apparatus body.

In some embodiments, the three supports include three leveling devices described above.

In some embodiments, the triangle defined by the three mounting points is an isosceles triangle. In some embodiments, the three supports include a first leveling device, a second leveling device, and a support; and a first distance between the first leveling device and the support and a second distance between the second leveling device and the support are substantially identical. In some embodiments, the triangle is an equilateral triangle.

BRIEF DESCRIPTION OF THE DRAWINGS

For a better understanding of the aforementioned aspects as well as additional aspects and embodiments, reference should be made to the Description of Embodiments below, in conjunction with the following drawings in which like reference numerals refer to corresponding parts throughout the figures.

Drawings are not drawn to scale unless explicitly noted otherwise.

DESCRIPTION OF EMBODIMENTS

Devices, apparatuses, and methods described herein allow for faster and more accurate leveling of an apparatus or a component thereof. By using components described herein, a convenient and accurate method for adjusting a heavy apparatus or component was achieved. Details of several embodiments are discussed below.

Reference will be made to certain embodiments, examples of which are illustrated in the accompanying drawings. While the claims will be described in conjunction with the embodiments, it will be understood that it is not intended to limit the claims to these particular embodiments alone. On the contrary, the embodiments are intended to cover alternatives, modifications and equivalents that are within the spirit and scope of the appended claims.

Moreover, in the following description, numerous specific details are set forth to provide a thorough understanding of the embodiments. However, it will be apparent to one of ordinary skill in the art that the embodiments may be practiced without these particular details. In other instances, components and procedures that are well-known to those of ordinary skill in the art are not described in detail to avoid obscuring aspects of the embodiments.

It will also be understood that, although the terms first, second, etc. may be used herein to describe various elements, these elements should not be limited by these terms. These terms are only used to distinguish one element from another. For example, a first portion could be termed a second portion, and, similarly, a second portion could be termed a first portion, without departing from the scope of the claims. The first portion and the second portion are both portions, but they are not the same portion.

The terminology used in the description of the embodiments herein is for the purpose of describing particular embodiments only and is not intended to be limiting of the invention. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1A:
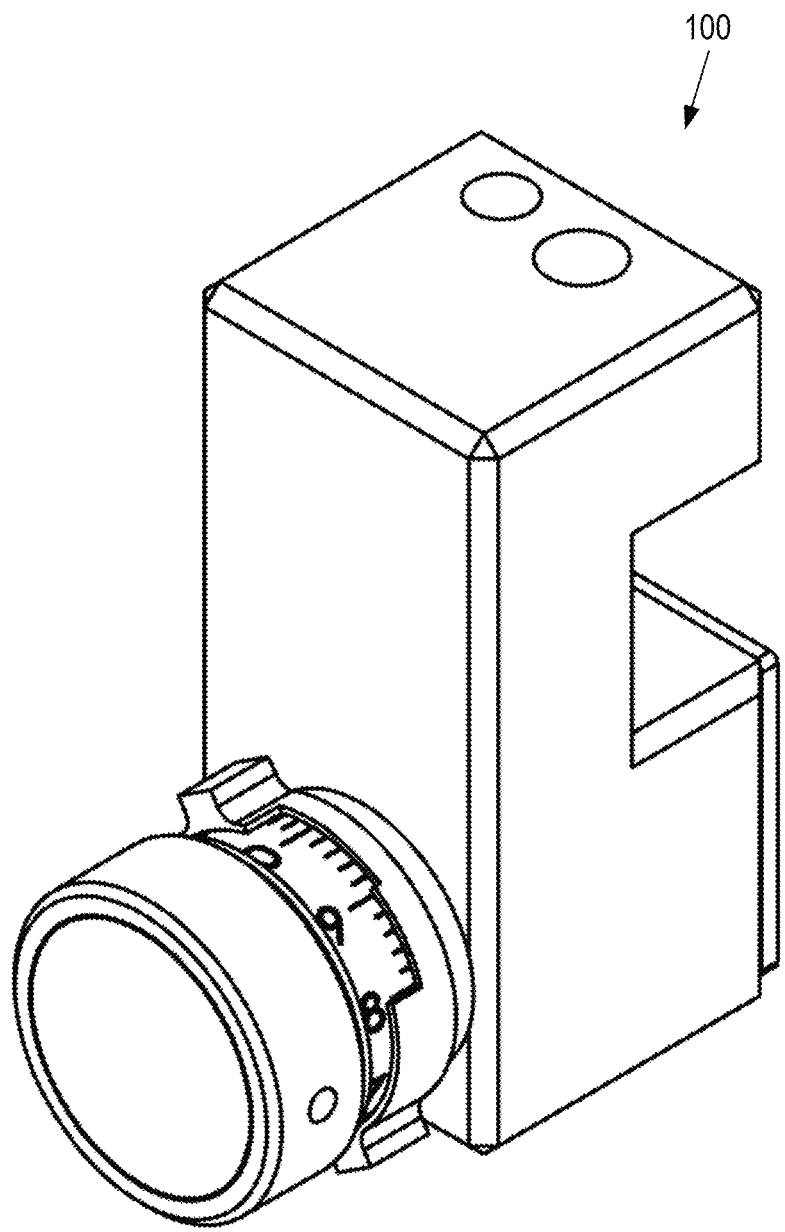
FIG. 1A is an isometric view of a leveling device in accordance with some embodiments.
Figure 1B:
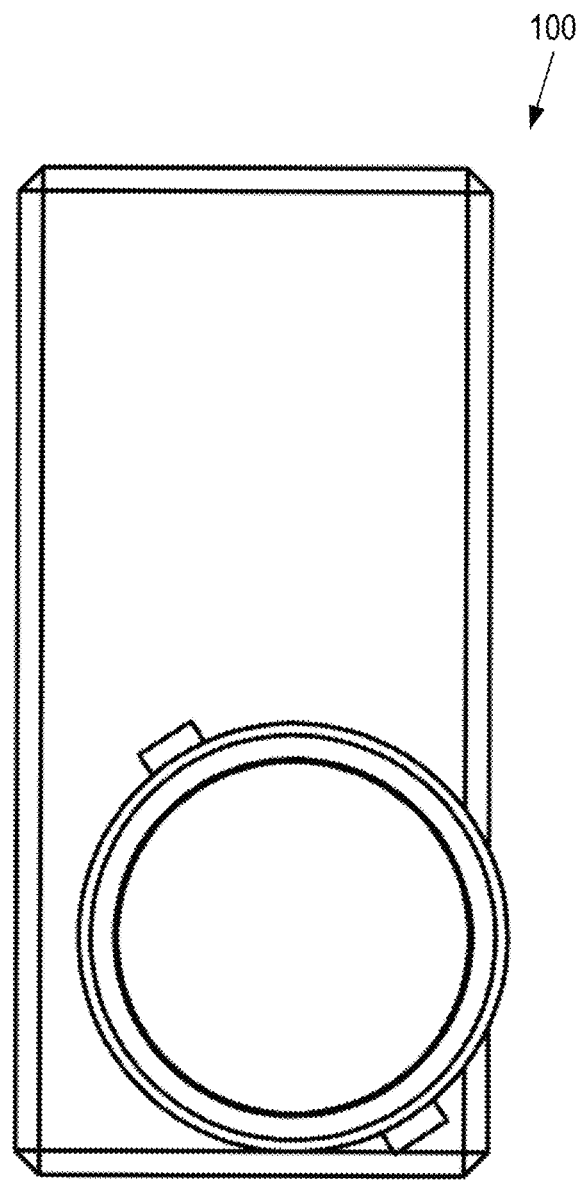
FIG. 1B is a front view of the leveling device shown in FIG. 1A.
Figure 1C:
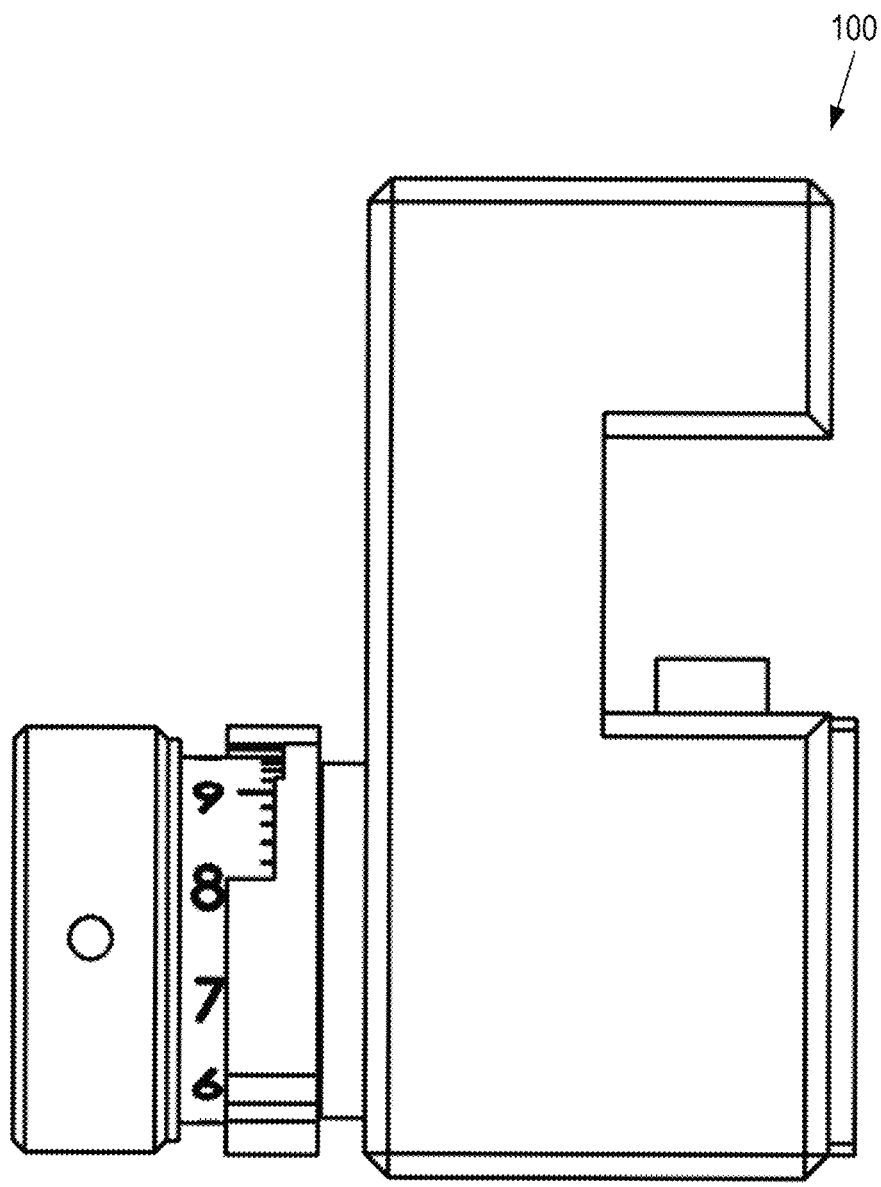
FIG. 1C is a right-side view of the leveling device shown in FIG. 1A.
Figure 1D:
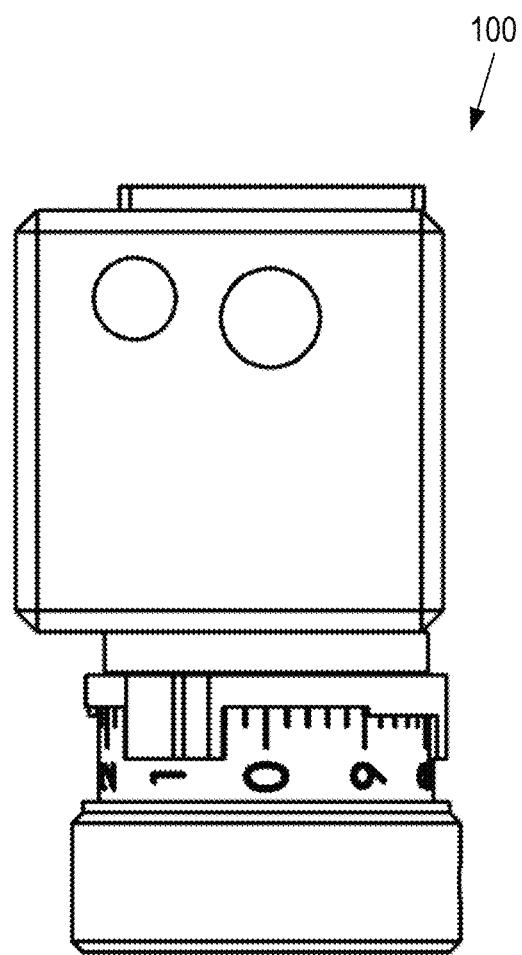
FIG. 1D is a top view of the leveling device shown in FIG. 1A.
Figure 1E:
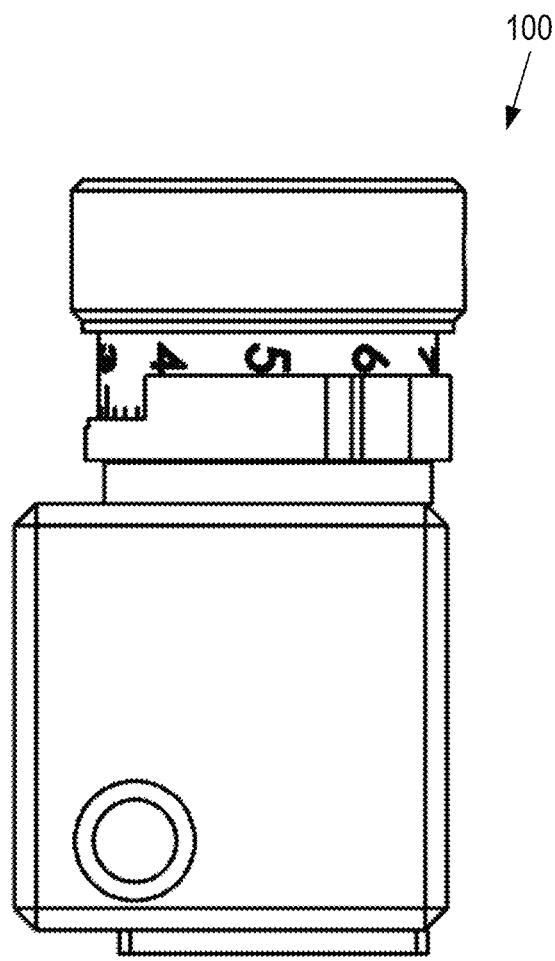
FIG. 1E is a bottom view of the leveling device shown in FIG. 1A.

FIG. 1A is an isometric view of a leveling device 100 in accordance with some embodiments.

In many industrial processes, it is important to have multiple components substantially parallel with each other (or level). For example, in chemical vapor deposition, if a wafer is not level, a uniformity of a deposited layer is reduced, which leads to increased variations among chips on the wafer and ultimately leads to poor performance of semiconductor devices and/or reduced yields.

However, existing methods for adjusting a component (e.g., a heating block used in chemical vapor deposition) are inaccurate, time-consuming, inefficient, inconvenient and cumbersome. For example, once it is found that a heating block is not level after a chemical vapor deposition process, the processing chamber needs to be cooled down. Once the processing chamber has cooled down, the heating block, mounted with vertical bolts and associated nuts, is adjusted by turning the bolts and nuts, which is imprecise and time consuming.

In comparison, the leveling device 100 allows adjustment of the heating block (or any other component used in semiconductor equipment) by turning a knob. The leveling device 100 includes a mechanism for accurately adjust a vertical position of the heating block (or any other component). In some embodiments, the heating block is adjusted without cooling the heating block, thereby reducing maintenance time needed for adjusting the heating block.

Additional views of the leveling device 100 are shown in FIGS. 1B-1E. The left-side view of the leveling device 100 is similar to a mirror image of the right-side view of the leveling device 100 shown in FIG. 1C. For brevity, the left-side view of the leveling device 100 is omitted herein.

Figure 2:
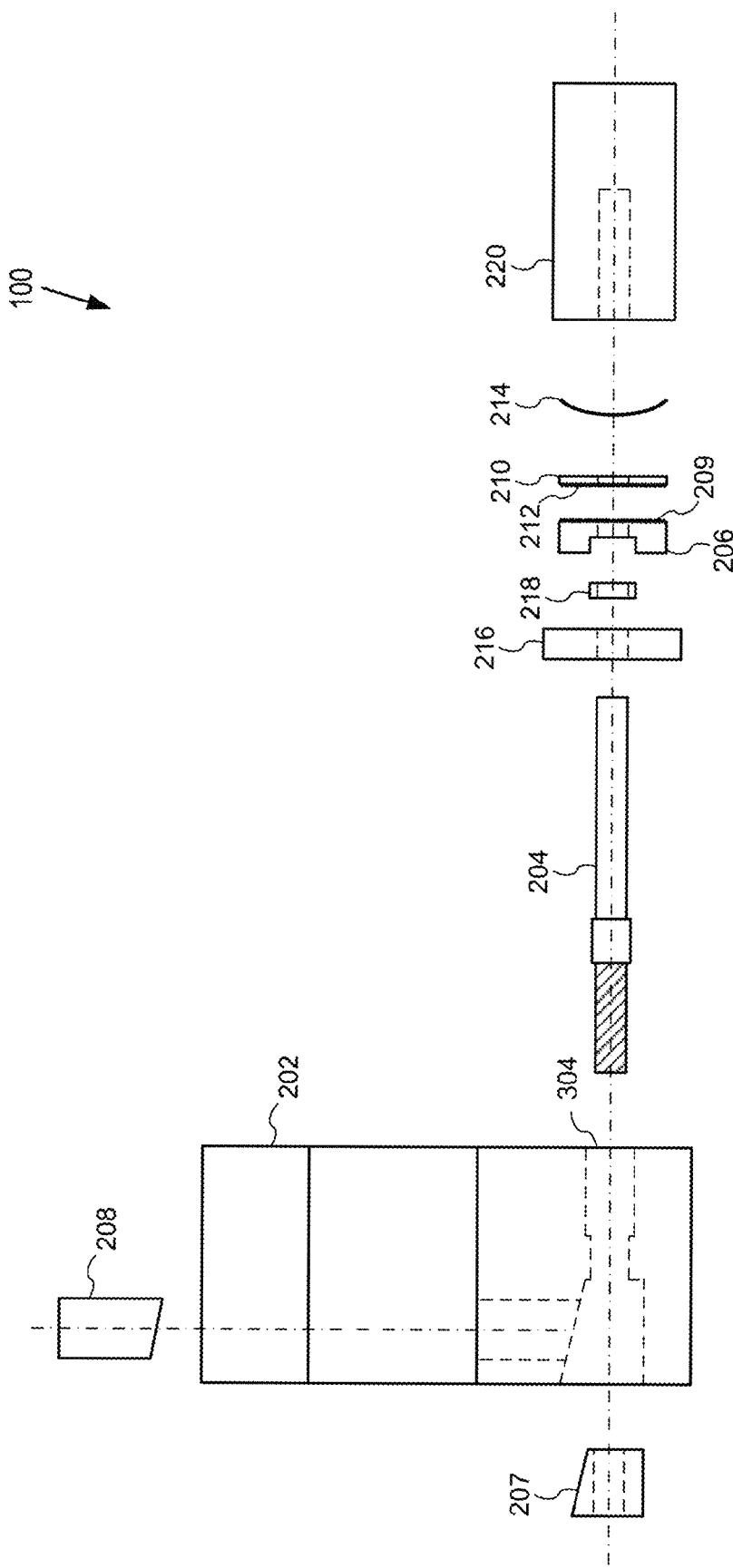
FIG. 2 is a high-level exploded view of a leveling device in accordance with some embodiments.

FIG. 2 is a high-level exploded view of a leveling device 100 in accordance with some embodiments. In FIG. 2, dashed lines indicate features that are hidden (e.g., not visible) in the exploded view. In FIG. 2, certain details are omitted for brevity.

The leveling device 100 includes a main body 202, which is used for mounting to an apparatus, supporting a component to be maintained at level, and/or holding other components of the leveling device 100.

The main body 202 defines a hole 304, into which a rod 204 is at least partially positioned. The rod 204 is rotatably coupled with the main body 202 (e.g., the rod 204 can rotate relative to the main body 202).

The leveling device 100 also includes an elevator block 207. The elevator block 207 is rotatably coupled with the rod 204 so that a rotation of the rod 204 moves the elevator block 207 linearly (e.g., along an axis defined by the rod 204). For example, at least a portion of the rod 204 (e.g., a portion 412 of the rod 204 shown in FIG. 4) includes a thread, and the elevator block 207 includes a corresponding thread (e.g., within a hole 510 shown in FIG. 5A) so that a rotation of the rod 204 moves the elevator block 207 along the axis defined by the rod 204. The elevator block 207 typically has a sloped top surface.

The leveling device 100 also includes an elevator pin 208, which is used to lift or lower a portion of an apparatus or a component thereof. In use, the elevator pin 208 is positioned over the elevator block 207. Thus, a linear movement of the elevator block 207 can push the elevator pin 208 upward so that the elevator pin 208 and an apparatus component that is associated with the elevator pin 208 is raised. In addition, an opposite linear movement of the elevator block 207 can pull the elevator pin 208 downward (e.g., with assistance of gravity or additional force applied on the elevator pin 208 and/or the associated apparatus components).

In some embodiments, the leveling device 100 includes one or more bearings and/or o-rings (not shown). The bearings/o-rings, if included, are placed on two opposite ends of the rod 204. In some embodiments, the rod 204 is coupled with the main body 202 (e.g., in particular, a base block of the main body 202) using a bearing located in the hole 304.

In some embodiments, the leveling device 100 includes a lock handle 216, in which a hub is defined. When assembled, the rod 204 extends through the hub of the lock handle 216.

The lock handle 216 is rotatably coupled with the main body 202 (e.g., a base block of the main body 202). For example, the lock handle 216 can rotate relative to the main body 202 (e.g., within a predetermined range). The lock handle 216, when engaged by a rotation in a first rotational direction, prevents a rotation of the rod 204. The lock handle 216, when released by a rotation in a second rotational direction that is opposite to the first rotational direction, allows a rotation of the rod 204.

In some embodiments, the leveling device 100 includes a lock plate 218, which is attached to the main body 202 (e.g., using screws) so that the lock handle 216 is positioned between the lock plate 218 and the main body 202. The lock plate 218 prevents release of the lock handle 216 from the main body 202 while allowing a rotation of the lock handle 216 within a predetermined range (and preventing a rotation of the lock handle 216 beyond the predetermined range).

In some embodiments, the leveling device 100 includes crown gears 206 and 210. As used herein, a crown gear refers to a gear that has a first face and a second face that is opposite to the first face, and has teeth grooved on at least one face. A crown-gear is typically disk-shaped. In some embodiments, the crown gear has teeth that project at right angles to a face of the crown gear. In some embodiments, a crown gear has a planar pitch surface and a planar root surface, both of which are perpendicular to an axis of rotation of the crown gear. A crown gear is also called a face gear.

The crown gears 206 and 210 are located between the main body 202 (in particular, a base block of the main body 202, which is described below with respect to FIG. 3A) and a knob 220. The crown gear 206 includes teeth 209. Similarly, the crown gear 210 includes teeth (not shown). When assembled, the teeth 209 of the crown gear 206 face the teeth of the crown gear 210.

In some embodiments, the crown gear 210 is coupled with the rod 204 so that a rotation of the rod 204 about an axis defined by the rod 204 causes a rotation of the crown gear 210, whereas the rotation of the rod 204 about an axis defined by the rod 204 does not cause a rotation of the crown gear 206 (e.g., the rod 204 is not rotatably coupled with the crown gear 206 so that the rod 204 can rotate independent of the crown gear 206).

In some embodiments, the leveling device 100 includes a spring 214 to press the crown gear 210 toward the crown gear 206. In FIG. 2, the spring 214 is a leaf spring. Alternatively, a spring of a different type (e.g., a coil spring) can be used.

The leveling device 100 includes a knob 220. In some embodiments, the knob 220 includes a knob assembly. In some embodiments, the knob 220 includes a micrometer with a sleeve (also called a barrel or stock), which is configured to be stationary (typically fixed to the main body 202) and a thimble, which is configured to rotate and is coupled with the rod 204. In some embodiments, the sleeve includes a scale (e.g., markings that indicates a number of rotations or a travelled distance). In some embodiments, the thimble includes markings that are used to determine an extent (e.g., degrees) of rotation of the thimble.

In some embodiments, the leveling device 100 includes a screw for attaching the leveling device 100 to an apparatus (e.g., a semiconductor processing chamber, such as a chemical vapor deposition chamber).

Figure 3A:
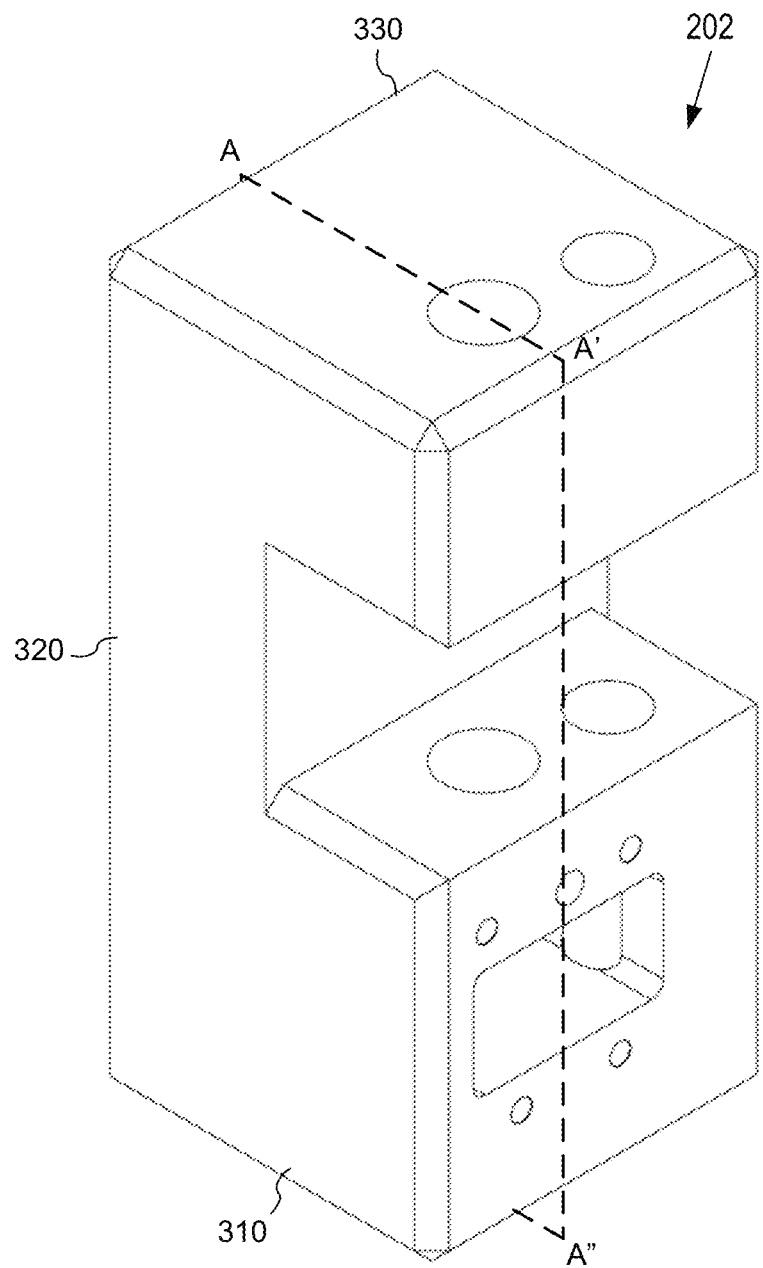
FIG. 3A is a perspective view of a main body of a leveling device in accordance with some embodiments.

FIG. 3A is a perspective view of a main body 202 of a leveling device 100 in accordance with some embodiments.

The main body 202 in FIG. 3A includes a base block 310, a connecting arm 320, and a top plate 330. The base block 310 and the top plate 330 are connected to the connecting arm 320 so that the connecting arm 320 is located between the base block 310 and the top plate 330. The connecting arm 320 has a particular width and a particular position such that the connecting arm 320, the base block 310, and the top plate 330 collectively define a recess (e.g., a space between the base block 310 and the top plate 330) in the main body 202. In some embodiments, as shown in FIG. 3A, the particular width of the connecting arm 320 is less than a width of the top plate 330 and a width of the base block 310. For example, while the base block 310, the connecting arm 320, and the top plate 330 in FIG. 3A have substantially the same depth, the width of the connecting arm 320 is less than the width of the base block 310 or the top plate 330 so that when the base block 310, the connecting arm 320, and the top plate 330 define a common plane, a recess is formed between the top plate 330 and the base block 310.

In some embodiments, the main body 202 is integrally formed. For example, the main body is made from a single block of material (e.g., metal, such as aluminum). In some cases, the single block of material is cut (e.g., sawed, milled, and/or drilled) to have a shape of the main body 202.

Figure 3B:
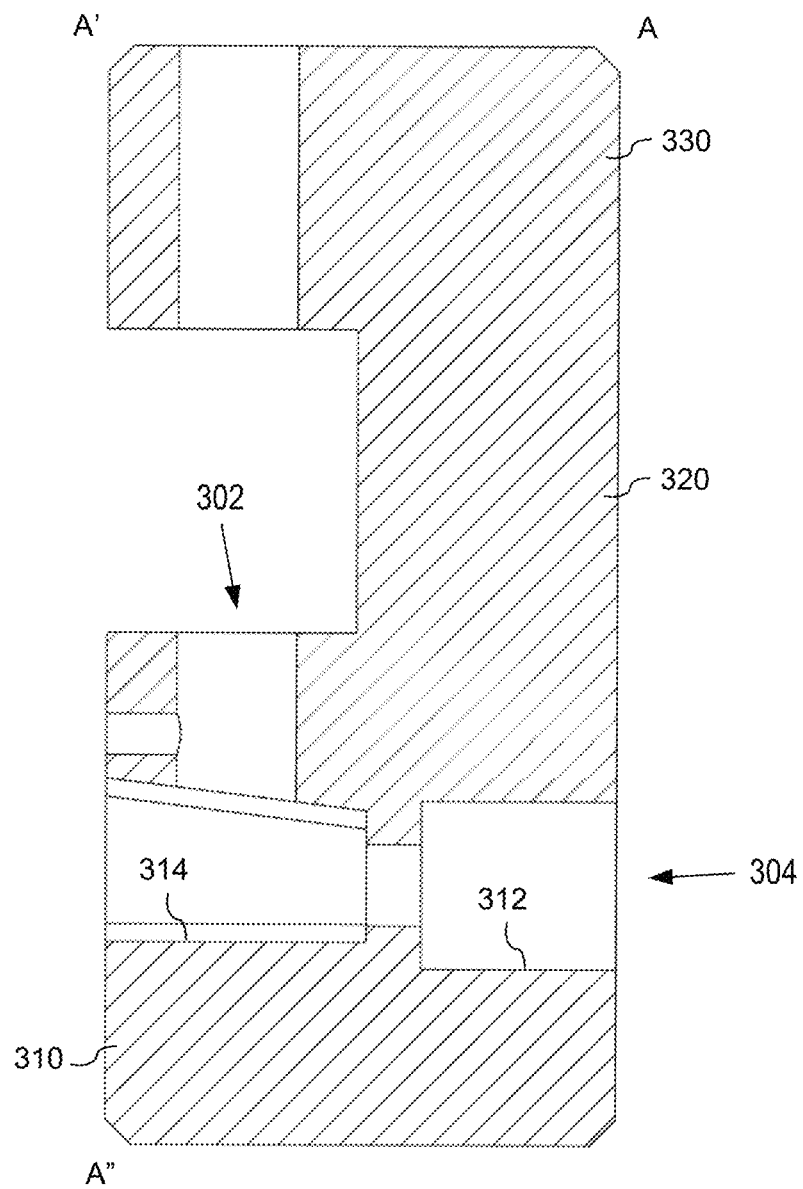
FIG. 3B is a cross-sectional view of a main body of a leveling device in accordance with some embodiments.

FIG. 3A also includes broken lines connecting points A, A', and A", which indicate a plane on which the cross-sectional view shown in FIG. 3B is taken.

FIG. 3B is a cross-sectional view of a main body 202 of a leveling device 100 (including a base block 310 of the leveling device 100) corresponding to a plane including points A, A', and A" shown in FIG. 3A.

Figure 10:
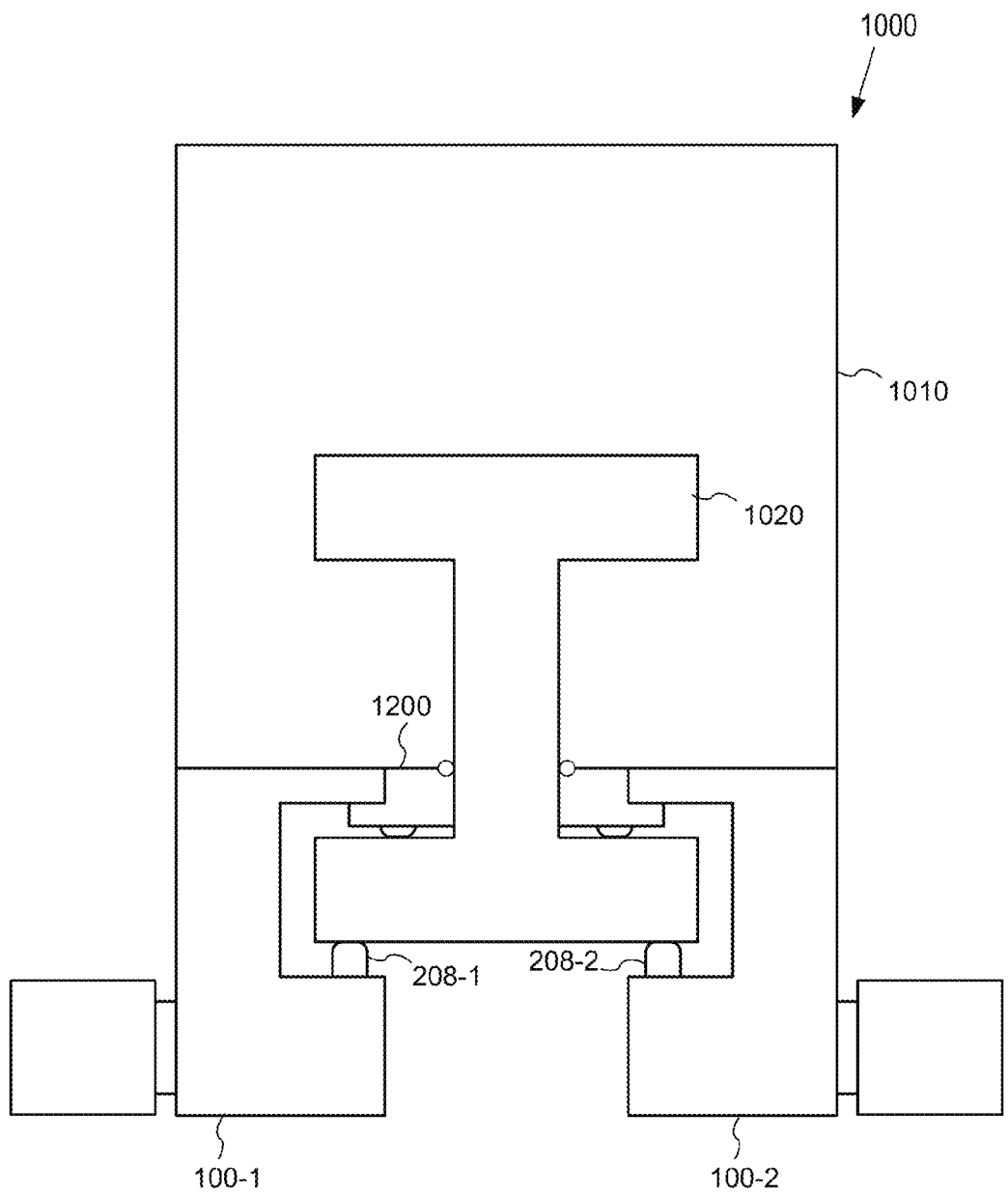
FIG. 10 is a high-level diagram illustrating an apparatus with leveling devices in accordance with some embodiments.

The base block 310 defines two holes. A first hole 302 of the two holes is defined on a side of the base block 310 that faces the top plate 330 (e.g., a top surface when the leveling device is mounted as shown in FIG. 10). As shown in FIG. 3B, a second hole 304 of the two holes is connected to the first hole 302, and the second hole 304 is substantially perpendicular to the first hole 302. In some embodiments, the second hole 304 is deemed to be substantially perpendicular to the first hole 302 when an angle between the an axis defined by the first hole 302 and an axis defined by the second hole 304 is between 65 and 115 degrees. In some embodiments, the second hole 304 is deemed to be substantially perpendicular to the first hole 302 when an angle between the an axis defined by the first hole 302 and an axis defined by the second hole 304 is between 70 and 110 degrees. In some embodiments, the second hole 304 is deemed to be substantially perpendicular to the first hole 302 when an angle between the an axis defined by the first hole 302 and an axis defined by the second hole 304 is between 75 and 105 degrees. In some embodiments, the second hole 304 is deemed to be substantially perpendicular to the first hole 302 when an angle between the an axis defined by the first hole 302 and an axis defined by the second hole 304 is between 80 and 100 degrees. In some embodiments, the second hole 304 is deemed to be substantially perpendicular to the first hole 302 when an angle between the an axis defined by the first hole 302 and an axis defined by the second hole 304 is between 85 and 95 degrees. In some embodiments, the second hole 304 is deemed to be substantially perpendicular to the first hole 302 when an angle between the an axis defined by the first hole 302 and an axis defined by the second hole 304 is between 87 and 93 degrees. In some embodiments, the second hole 304 is deemed to be substantially perpendicular to the first hole 302 when an angle between the an axis defined by the first hole 302 and an axis defined by the second hole 304 is between 88 and 92 degrees. In some embodiments, the second hole 304 is deemed to be substantially perpendicular to the first hole 302 when an angle between the an axis defined by the first hole 302 and an axis defined by the second hole 304 is between 89 and 91 degrees.

The second hole 304 has a first portion 312 and a second portion 314. The first portion 312 of the second hole 304 has a circular cross section. In some embodiments, the second portion 314 of the second hole 304 has a cross section that is not circular (e.g., a rectangular cross section). In some embodiments, at least a bottom surface of second portion 314 of the second hole 304 uniformly extends toward the first portion 312 of the second hole 304, which facilitates sliding of an elevator block (e.g., the elevator block 207 in FIG. 2) thereon. In some embodiments, the first hole 302 of the two holes is directly connected to the second portion 314 of the second hole 304, as shown in FIG. 3B.

Figure 4:
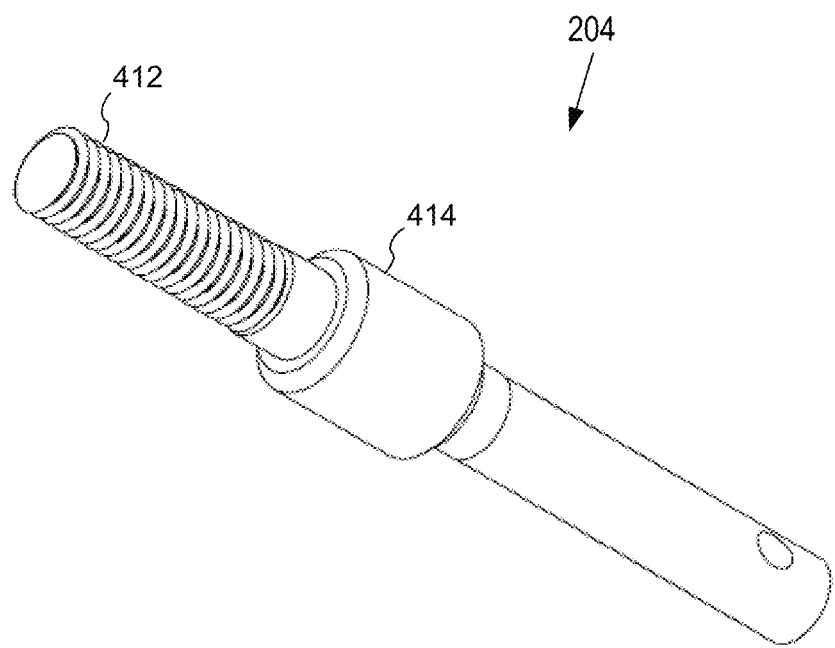
FIG. 4 is a perspective view of a rod in accordance with some embodiments.

FIG. 4 is a perspective view of a rod 204 in accordance with some embodiments. At least a first portion 412 of the rod 204 is threaded (e.g., the first portion 412 of the rod 204 has a first thread). In some embodiments, a second portion 414 of the rod 204 is not threaded. As shown in FIG. 2, the rod 204 is typically coupled with a knob that is positioned at least partially outside the main body 202, when assembled.

Figure 5A:
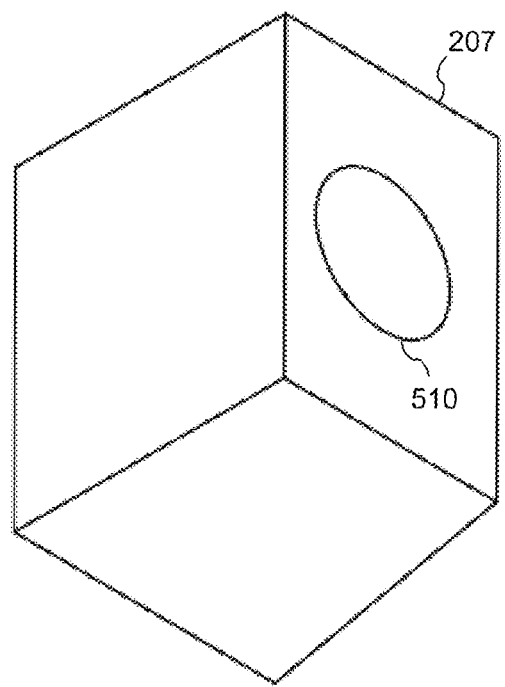
FIG. 5A is a perspective view of an elevator block in accordance with some embodiments.

FIG. 5A is a perspective view of an elevator block 207 in accordance with some embodiments.

When assembled, the elevator block 207 is at least partially positioned in the second portion 314 of the second hole 304 of the base block 310 (e.g., see FIG. 1).

The elevator block 207 is rotatably coupled with the rod 204 and slidably coupled with the base block 310, when assembled. For example, the rod 204 can rotate with respect to the elevator block 207, and the elevator block 207 can slide on a bottom surface of the second portion 314 of the base block 310.

The elevator block 207 defines a hole 510 (e.g., a throughhole) that is threaded (e.g., the hole 510 has the first thread that matches the threading of the rod 204). In some embodiments, a rotation of the rod 204 causes the elevator block 207 to slide on the bottom surface of the second portion 314 of the base block 310.

When assembled, at least a part of the first portion 412 of the rod 204, having the first thread, is positioned in the hole 510 of the elevator block 207.

Figure 5B:
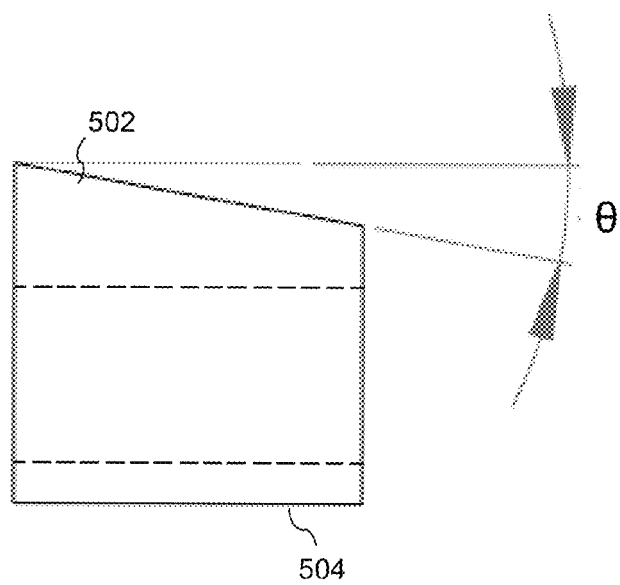
FIG. 5B is a frontal view of an elevator block in accordance with some embodiments.

FIG. 5B is a frontal view of an elevator block 207 in accordance with some embodiments. In FIG. 5B, dashed lines indicate features that are hidden (e.g., not visible) in the frontal view.

In some embodiments, when assembled, a bottom surface 504 of the elevator block 207 is substantially parallel to an axis defined by the rod 204 (e.g., an axis defined by the hole 510 is substantially parallel to the axis defined by the rod 204). In some embodiments, the bottom surface 504 of the elevator block 207 is deemed to be substantially parallel to the axis defined by the rod 204 when an angle formed by a surface normal of the bottom surface 504 of the elevator block 207 and the axis defined by the rod 204 is between 60 and 120 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 70 and 110 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 75 and 105 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 80 and 100 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 85 and 95 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 87 and 93 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 88 and 92 degrees. In some embodiments, the bottom surface 504 of the elevator block 207 is deemed to be substantially parallel to the axis defined by the rod 204 when an angle formed by the surface normal of the bottom surface 504 of the elevator block 207 and the axis defined by the rod 204 is between 89 and 91 degrees.

The elevator block 207 has a top surface 502 that is opposite to the bottom surface 504 and that is not parallel to the bottom surface 504. For example, the bottom surface 504 and the top surface 502 form an angle $\theta$. In some embodiments, $\theta$ is between −25 and 25 degrees. In some embodiments, $\theta$ is between −20 and 20 degrees. In some embodiments, $\theta$ is between −15 and 15 degrees. In some embodiments, $\theta$ is between −10 and 10 degrees. In some embodiments, $\theta$ is between −5 and 5 degrees. In some embodiments, $\theta$ is between −3 and 3 degrees. In some embodiments, $\theta$ is between −2 and 2 degrees. In some embodiments, $\theta$ is between −1 and 1 degree.

Figure 6A:
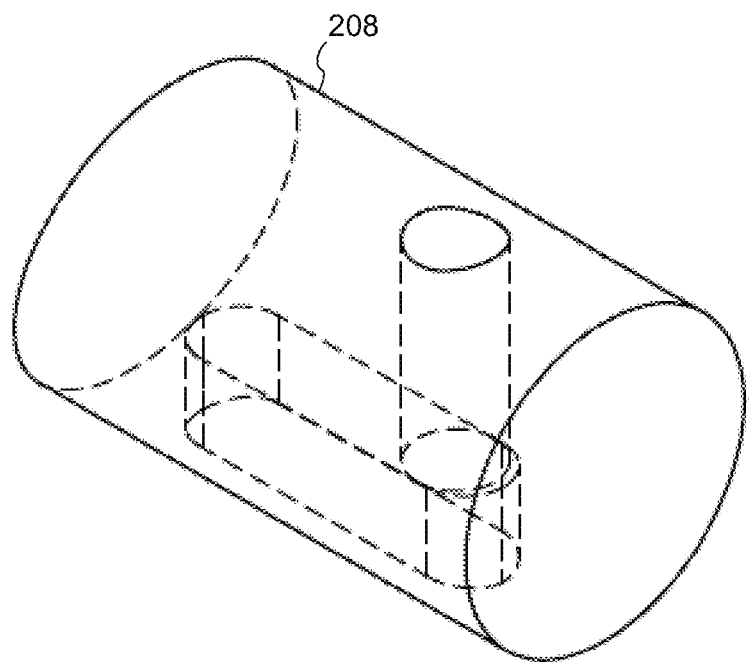
FIG. 6A is a perspective view of an elevator pin in accordance with some embodiments.

FIG. 6A is a perspective view of an elevator pin 208 in accordance with some embodiments. In FIG. 6A, dashed lines indicate features that are hidden (e.g., not visible) in the perspective view.

When assembled, the elevator pin 208 is slidably coupled with the base block 310 and slidably coupled with the elevator block 207. For example, the elevator pin 208 can slide up and down with respect to the base block 310 (e.g., within the first hole 302) and slide over the elevator block 207 (e.g., over the top surface 502 of the elevator block 207).

Thus, when assembled, the elevator pin 208 is at least partially positioned in the first hole 302 of the base block 310 so that the elevator pin 208 is configured to slide along the first hole 302 of the base block 310.

Figure 6B:
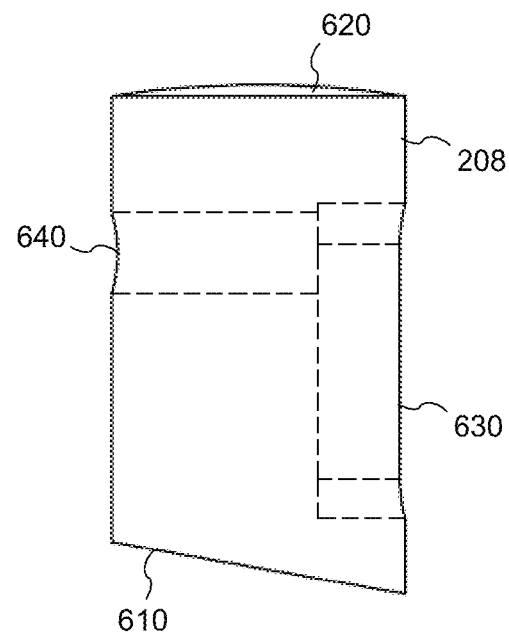
FIG. 6B is a frontal view of an elevator pin in accordance with some embodiments.

FIG. 6B is a frontal view of an elevator pin 208 in accordance with some embodiments. In FIG. 6B, dashed lines indicate features that are hidden (e.g., not visible) in the frontal view.

In some embodiments, the elevator pin has a first end 610 and a second end 620 that is opposite to the first end 610 and that is not parallel to the first end 610. For example, as shown in FIG. 6B, the second end 620 is curved and is at an angle with respect to the first end 610.

In some embodiments, the first end 610 of the elevator pin 208 is substantially parallel to the top surface 502 of the elevator block 207.

In some embodiments, the elevator pin 208 defines other holes 630 and 640 therein. In some embodiments, the hole 630 is used to guide a sliding movement of the elevator pin 208. In some embodiments, the hole 640 is used to prevent the elevator pin 208 from sliding out of the main body 202.

Figure 7A:
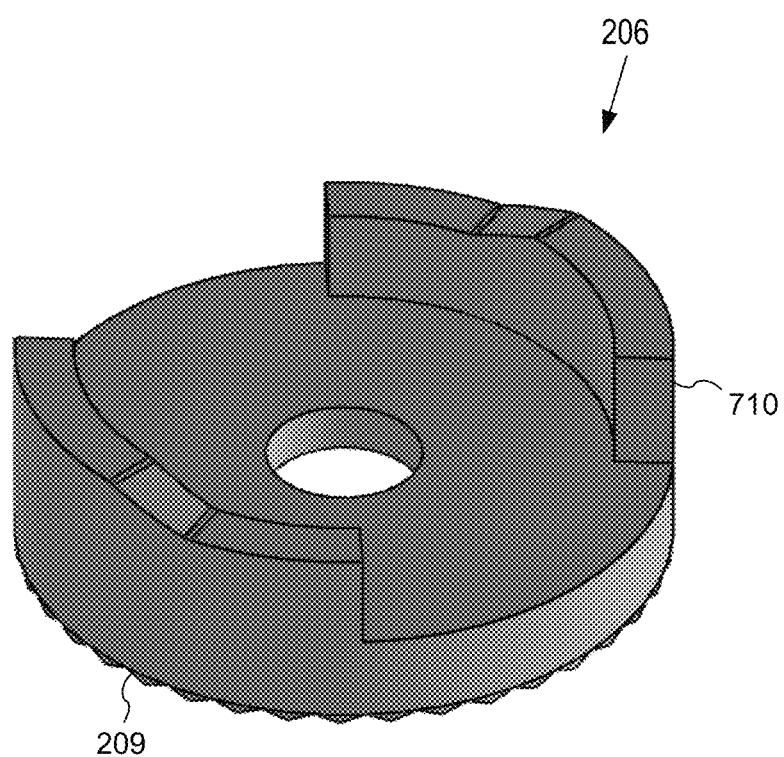
FIG. 7A is a perspective view of a crown gear in accordance with some embodiments.

FIG. 7A is a perspective view of a crown gear 206 in accordance with some embodiments.

As shown in FIG. 7A, the crown gear 206 has the teeth 209 on one side. In some embodiments, the crown gear 206 has one or more grooves 710 on a side that is opposite to the side with the teeth 209. The one or more grooves 710 are used to prevent (e.g., lock) a rotation of the rod 204.

Figure 7B:
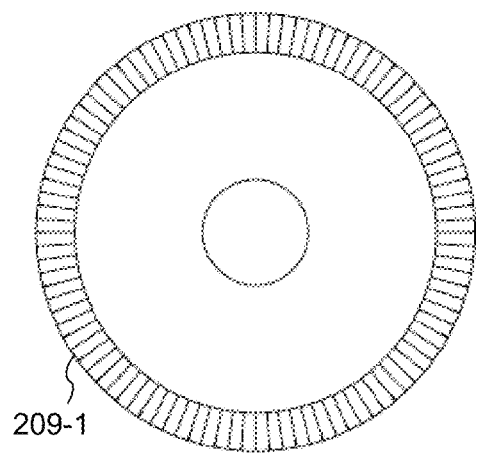
FIG. 7B is a frontal view of a crown gear in accordance with some embodiments.

FIG. 7B is a frontal view of a crown gear 206 in accordance with some embodiments.

The crown gear 206 has a tooth pattern 209-1 that extends all the way around a periphery of the crown gear 206.

Figure 7C:
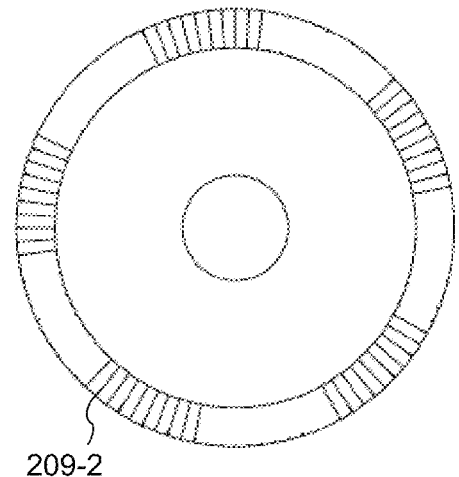
FIG. 7C is a frontal view of a crown gear in accordance with some embodiments.

FIG. 7C is a frontal view of a crown gear in accordance with some embodiments.

In FIG. 7C, the crown gear 206 has a tooth pattern 209-2, in which teeth are grouped along a periphery of the crown gear 206. In FIG. 7C, two adjacent groups of teeth are separated from each other so that a portion along the periphery of the crown gear 206 between the two adjacent groups of teeth does not include teeth. For example, as shown in FIG. 7C, along the periphery of the crown gear 206, there are areas where teeth are not included (e.g., removed). This reduces sticking of the crown gear 206 to the crown gear 210 when a heavy load is applied, by reducing an area of contact between the crown gear 206 and the crown gear 210.

Figure 8:
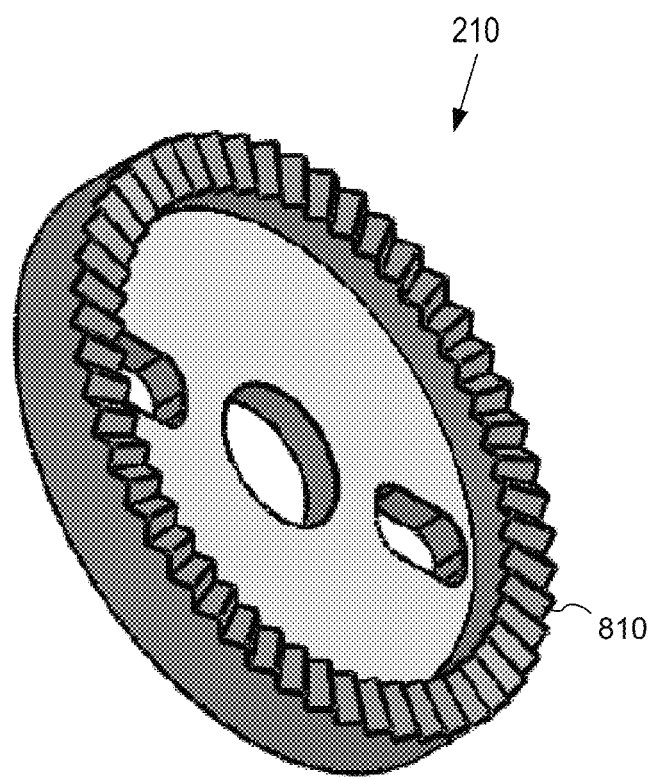
FIG. 8 is a perspective view of a crown gear in accordance with some embodiments.

FIG. 8 is a perspective view of a crown gear 210 in accordance with some embodiments.

The crown gear 210 has teeth 810 on one side. In some embodiments, a side that is opposite to the side with teeth 810 does not include teeth.

In some embodiments, one of the two crown gears 206 and 210 is made of aluminum. In some embodiments, one of the two crown gears 206 and 210 is made of brass. In some embodiments, one of the two crown gears 206 and 210 is made of titanium. For example, in some embodiments, both the crown gear 206 and the crown gear 210 are made of aluminum. In some embodiments, both the crown gear 206 and the crown gear 210 are made of brass. In some embodiments, both the crown gear 206 and the crown gear 210 are made of titanium. In some embodiments, the crown gear 206 is made of titanium and the crown gear 210 is made of aluminum. In some embodiments, the crown gear 206 is made of aluminum and the crown gear 210 is made of titanium. In some embodiments, the crown gear 206 is made of aluminum and the crown gear 210 is made of brass. In some embodiments, the crown gear 206 is made of brass and the crown gear 210 is made of aluminum. In some embodiments, the crown gear 206 is made of brass and the crown gear 210 is made of titanium. In some embodiments, the crown gear 206 is made of titanium and the crown gear 210 is made of brass.

Figure 9A:
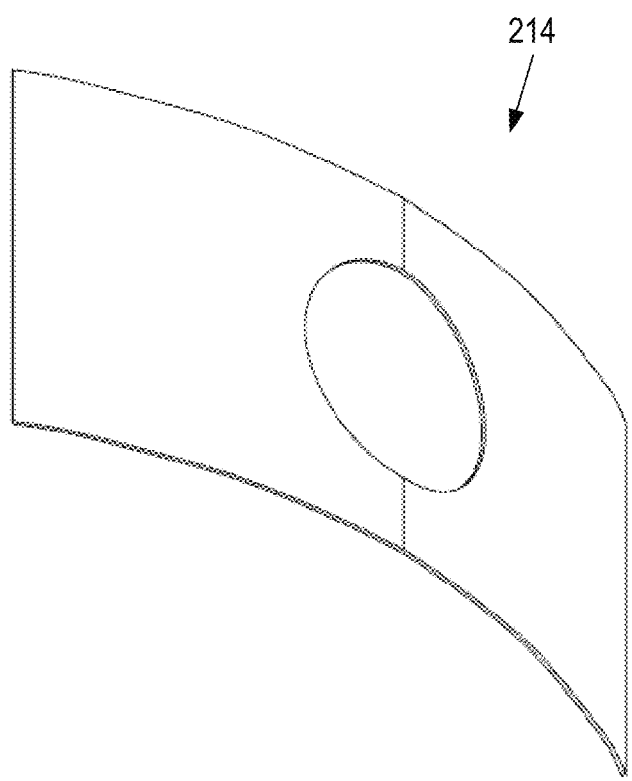
FIG. 9A is a perspective view of a spring in accordance with some embodiments.

FIG. 9A is a perspective view of a spring 214 in accordance with some embodiments.

In FIG. 9A, the spring 214 is a leaf spring. In other embodiments, a spring of a different type (e.g., a coil spring) is used. When assembled, the spring 214 is coupled with one of the two crown gears (e.g., the crown gear 210) and configured to apply force on the one crown gear (e.g., the crown gear 210) so that the teeth of the crown gear (e.g., the crown gear 210) are in contact with the teeth of another crown gear (e.g., the crown gear 206). In addition, the spring 214 allows one of the two crown gears (e.g., the crown gear 210) to retract from (e.g., move away from) the other crown gear (e.g., the crown gear 206), when a force is applied, so that the other crown gear (e.g., the crown gear 206) can rotate relative to the one crown gear (e.g., the crown gear 210).

The combination of the spring 214 and the crown gears 206 and 210 provide feedback to a user when the user turns the knob. In some embodiments, the feedback includes a tactile feedback (e.g., a clicking sensation as the crown gears 206 and 210 skip by a tooth). In some embodiments, the feedback includes an audible feedback (e.g., a clicking sound). Such feedback further facilitates an accurate adjustment of the leveling device 100.

Figure 9B:
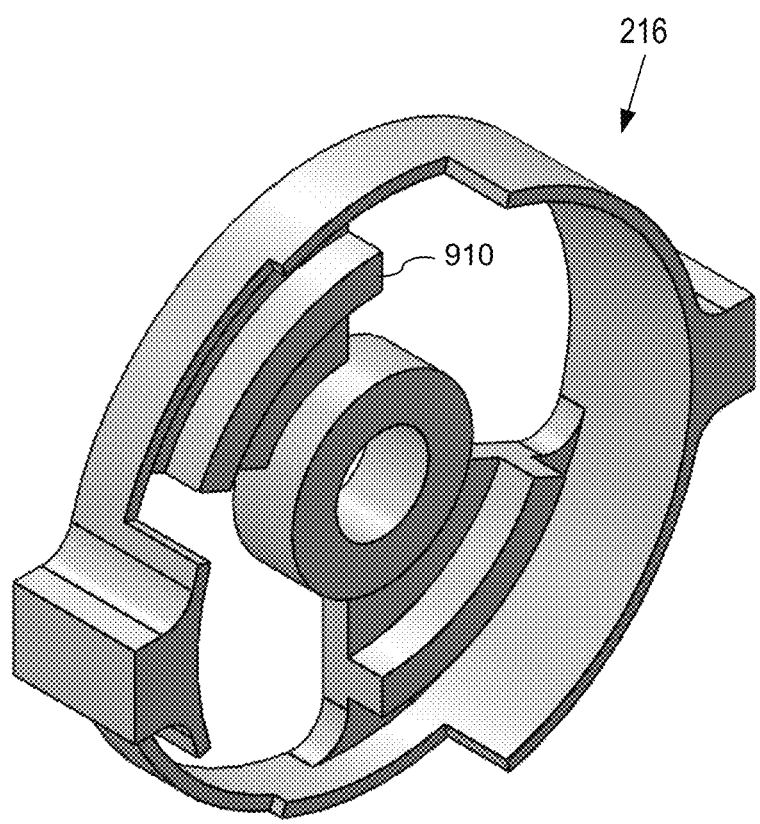
FIG. 9B is an isometric view of a lock handle in accordance with some embodiments.

FIG. 9B is an isometric view of a lock handle 216 in accordance with some embodiments.

The lock handle includes one or more grooves 910. When assembled, the lock handle 216 is positioned between the crown gear 206 and the base block 310 so that the one or more grooves 910 of the lock handle 216 face, and are in contact with, the one or more grooves 710 of the crown gear 206.

The lock handle 216 is configured to provide, in accordance with a rotation of the lock handle 216 about the axis defined by the rod 204, force on the crown gear 206 toward the crown gear 210 so that the crown gear 210 is prevented from a rotation about the axis defined by the rod 204. For example, when the lock handle 216 is rotated, the one or more grooves 910 of the lock handle 216 slide on the one or more grooves 710 of the crown gear 206 and push the one or more grooves 710 of the crown gear 206 toward the crown gear 210. Thus, the crown gear 206 is configured to move toward, and/or away from, the crown gear 210 in accordance with a rotation of the lock handle 216 about the axis defined by the rod 204. Once a sufficient force is applied on the crown gear 206, the crown gear 206 and the crown gear 210 cannot rotate relative to each other. Because the crown gear 206 is prevented from rotating about the axis defined by the rod 204 (e.g., rotationally fixed using the lock plate 218), the crown gear 210 is also prevented from a rotation when the lock handle 216 pushes the crown gear 206 toward the crown gear 210.

FIG. 10 is a high-level diagram illustrating an apparatus 1000 with leveling devices in accordance with some embodiments.

In some embodiments, the apparatus 1000 is chemical vapor deposition equipment that is coupled with a heating block 1020. For brevity, details of the chemical vapor deposition equipment (e.g., shower head, wafer, gas channels, etc.) are omitted. The apparatus 1000 includes a chamber 1010.

The heating block 1020 is rotatably or tiltably coupled with the chemical vapor deposition equipment (e.g., the heating block 1020 can tilt) with respect to the chamber 1010. For example, the heating block 1020 can rotate (e.g., within a range) or tilt relative to the chamber 1010, which allows an adjustment of a substrate positioned on the heating block 1020 so that the substrate can be positioned level with respect to another component within the chamber 1010 (e.g., a shower head).

The apparatus 1000 in FIG. 10 is coupled with at least two leveling devices 100 (e.g., leveling device 100-1 and leveling device 100-2). Each of the two leveling devices (e.g., the leveling device 100-1) is attached to the apparatus 1000 under the apparatus 1000 (e.g., using a mounting screw). The elevator pins 208 (e.g., 208-1 and 208-2) of the leveling devices 100 support the heating block 1020. By adjusting one or more leveling devices 100, a tilt of the heating block 1020 can be reduced (e.g., the heating block 1020 can be leveled).

The apparatus 1000 in FIG. 10 also includes a jig 1200. The jig 1200 typically includes spring-loaded pins, which apply downward pressure (or force) on the heating block 1200 so that the heating block 1200 is in firm contact with the pins 208.

Although FIG. 10 illustrates that the jig 1200 is positioned so that the spring-loaded pins face away from the chamber 1010, a person having ordinary skill in the art would understand that the jib 1200 can be positioned so that the spring-loaded pins face the camber 1010.

Figure 11:
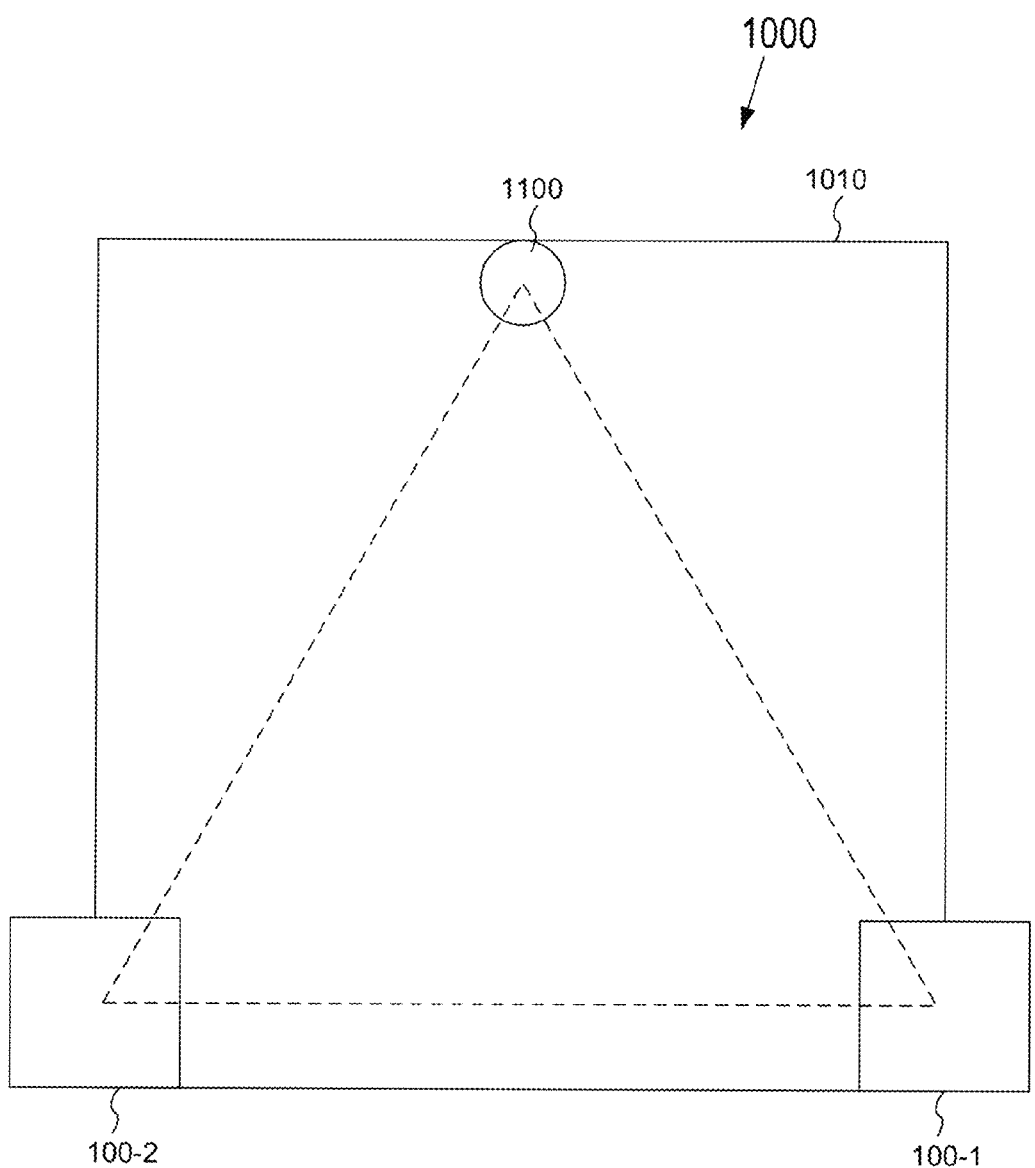
FIG. 11 illustrates mounting points of an apparatus in accordance with some embodiments.

FIG. 11 illustrates mounting points of an apparatus 1000 in accordance with some embodiments. Shown in FIG. 11 is a bottom view of the apparatus 1000, which include a bottom side of the chamber 1010. There apparatus 1000 has three mounting points, where two leveling devices 100 (e.g., 100-1 and 100-2) and a pin 1100 are placed. In some embodiments, the two leveling devices 100 and the pin 1100 operate as a kinematic coupling, thereby providing stable and yet adjustable support for the apparatus 1000.

In some embodiments, a third leveling device is used instead of the pin 1100.

Figure 12:
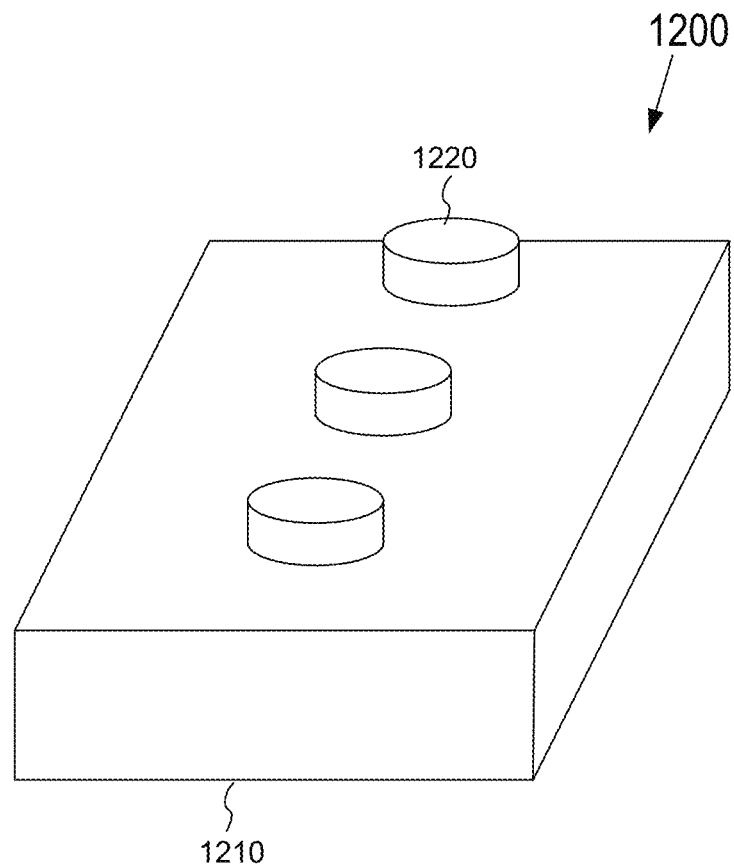
FIG. 12 is a perspective view of a jig in accordance with some embodiments.

FIG. 12 is a perspective view of a jig 1200 in accordance with some embodiments.

The jig 1200 includes a block 1210 and one or more spring-loaded pins 1220.

In use, the jig 1200 is positioned between the apparatus body (e.g., the chamber 1010) and a base block of the tiltable component (e.g., the heater block 1020), as shown in FIG. 10. When in use, the jig 1200 is in contact with the apparatus body (e.g., the chamber 1010) and the base block of the tiltable component (e.g., the heater block 1020) so that the jig 1200 pushes the base block of the tiltable component (e.g., the heater block 1020) away from the apparatus body (e.g., the chamber 1010).

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A leveling device, comprising:
   a main body that has a base block, a connecting arm, and a top plate, wherein:
      the base block and the top plate are connected to the connecting arm so that the connecting arm is located between the base block and the top plate, wherein the connecting arm has a particular width and a particular position such that the connecting arm, the base block, and the top plate collectively define a recess in the main body; and
      the base block defines two holes, wherein:
         a first hole of the two holes is defined on a side of the base block that faces the top plate;
         a second hole of the two holes is connected to the first hole, and the second hole is substantially perpendicular to the first hole; and
         the second hole has a first portion and a second portion, the first portion of the second hole having a circular cross section and the second portion of the second hole having a cross section that is not circular;
   a rod rotatably coupled with the main body, wherein:
      the rod is at least partially positioned in the first portion of the second hole of the base block and the second portion of the second hole of the base block;
      a first portion of the rod, positioned toward the second hole, has a first thread;
      a second portion of the rod is not threaded; and
      the rod is coupled with a knob that is positioned at least partially outside the main body;
   an elevator block rotatably coupled with the rod and slidably coupled with the base block, wherein:
      the elevator block is at least partially positioned in the second portion of the second hole of the base block;
      the elevator block has a bottom surface that is substantially parallel to an axis defined by the rod;
      the elevator block has a top surface that is opposite to the bottom surface and that is not parallel to the bottom surface;
      the elevator block defines a hole that has the first thread; and
      at least a part of the first portion of the rod, having the first thread, is positioned in the hole of the elevator block;
   an elevator pin slidably coupled with the base block and slidably coupled with the elevator block, wherein:
      the elevator pin is at least partially positioned in the first hole of the base block so that the elevator pin is configured to slide along the first hole of the base block; and
      the elevator pin has a first end and a second end that is opposite to the first end and that is not parallel to the first end.

2. The leveling device of claim 1, wherein the first end of the elevator pin is substantially parallel to the top surface of the elevator block.

3. The leveling device of claim 1, further comprising:
   two crown gears located between the base block of the main body and the knob, wherein:
      teeth of a first crown gear of the two crown gears face teeth of a second crown gear of the two crown gears;
      the second crown gear is coupled with the rod so that a rotation of the rod about an axis defined by the rod causes a rotation of the second crown gear about the axis defined by the rod; and
      the rotation of the rod about the axis defined by the rod does not cause a rotation of the first crown gear; and
   a spring coupled with, and configured to apply force on, one of the two crown gears so that the teeth of the first crown gear of the two crown gears are in contact with the teeth of the second crown gear of the two crown gears.

4. The leveling device of claim 3, wherein one of the two crown gears is made of titanium.

5. The leveling device of claim 4, wherein a remaining one of the two crown gears is made of aluminum.

6. The leveling device of claim 3, wherein one crown gear of the two crown gears has groups of teeth along a periphery of the crown gear and two adjacent groups of teeth are separated from each other so that a portion along the periphery of the crown gear between the two adjacent groups of teeth does not include teeth.

7. The leveling device of claim 3, further comprising:
a lock handle that includes one or more grooves, wherein:
the lock handle is rotatably coupled with the base block;
the first crown gear includes one or more grooves on a surface that is opposite to the teeth of the first crown gear;
the lock handle is positioned between the first crown gear and the base block so that the one or more grooves of the lock handle face, and are in contact with, the one or more grooves of the first crown gear;
the lock handle is configured to provide, in accordance with a rotation of the lock handle about the axis defined by the rod, force on the first crown gear toward the second crown gear so that the second crown gear is prevented from a rotation about the axis defined by the rod.

8. The leveling device of claim 7, wherein:
the first crown gear is prevented from rotating about the axis defined by the rod; and
the first crown gear is configured to move toward and away from the second crown gear in accordance with a rotation of the lock handle about the axis defined by the rod.

9. The leveling device of claim 3, wherein the rod is coupled with the base block of the main body using a bearing located in the second hole of the base block.

10. An apparatus, comprising:
an apparatus body having three mounting points under the apparatus body, wherein the three mounting points define a shape of a triangle on a particular plane;
a tiltable component at least partially located within the apparatus body and at least partially extends outside the apparatus body under the apparatus body; and
three supports positioned at the three mounting points of the apparatus body and coupled with the tiltable component, wherein the three supports include at least two of a leveling device that each comprises:
a main body that has a base block, a connecting arm, and a top plate, wherein:
the base block and the top plate are connected to the connecting arm so that the connecting arm is located between the base block and the top plate, wherein the connecting arm has a particular width and a particular position such that the connecting arm, the base block, and the top plate collectively define a recess in the main body; and
the base block defines two holes, wherein:
a first hole of the two holes is defined on a side of the base block that faces the top plate;
a second hole of the two holes is connected to the first hole, and the second hole is substantially perpendicular to the first hole; and
the second hole has a first portion and a second portion, the first portion of the second hole having a circular cross section and the second portion of the second hole having a cross section that is not circular;
a rod rotatably coupled with the main body, wherein:
the rod is at least partially positioned in the first portion of the second hole of the base block and the second portion of the second hole of the base block;
a first portion of the rod, positioned toward the second hole, has a first thread;
a second portion of the rod is not threaded; and
the rod is coupled with a knob that is positioned at least partially outside the main body;
an elevator block rotatably coupled with the rod and slidably coupled with the base block, wherein:
the elevator block is at least partially positioned in the second portion of the second hole of the base block;
the elevator block has a bottom surface that is substantially parallel to an axis defined by the rod;
the elevator block has a top surface that is opposite to the bottom surface and that is not parallel to the bottom surface;
the elevator block defines a hole that has the first thread; and
at least a part of the first portion of the rod, having the first thread, is positioned in the hole of the elevator block;
an elevator pin slidably coupled with the base block and slidably coupled with the elevator block, wherein:
the elevator pin is at least partially positioned in the first hole of the base block so that the elevator pin is configured to slide along the first hole of the base block; and
the elevator pin has a first end and a second end that is opposite to the first end and that is not parallel to the first end.

11. The apparatus of claim 10, further comprising:
at least one jig, wherein:
the jig includes a block and one or more spring-loaded pins; and
the jig is positioned between the apparatus body and a base block of the tiltable component and in contact with the apparatus body and the base block so that the jig pushes the base block of the tiltable component away from the apparatus body.

12. The apparatus of claim 10, wherein one of the three supports is an immovable pin.

13. The apparatus of claim 10, wherein the leveling device defines a through-hole, which is used to mount the leveling device to the apparatus body.

14. The apparatus of claim 10, wherein the three supports include three of the leveling device.

15. The apparatus of claim 10, wherein the triangle defined by the three mounting points is an isosceles triangle.

16. The apparatus of claim 15, wherein:
the three supports include a first leveling device, a second leveling device, and a support; and
a first distance between the first leveling device and the support and a second distance between the second leveling device and the support are substantially identical.

17. The apparatus of claim 15, wherein the triangle is an equilateral triangle.

18. The apparatus of claim 10, wherein the particular plane defined by the three mounting points is substantially parallel to a plane defined by a base block of the tiltable component.

\* \* \* \* \*